(12) United States Patent
Kim et al.

(10) Patent No.: US 7,792,081 B2
(45) Date of Patent: Sep. 7, 2010

(54) WIRELESS SYSTEM FOR COMMUNICATING HETEROGENEOUS NETWORK INFORMATION FOR PERFORMING HANDOVER TO A NETWORK

(75) Inventors: Yong Ho Kim, Bucheon-si (KR); Yong Won Kwak, Anyang-si (KR); Jin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 658 days.

(21) Appl. No.: 11/399,839

(22) Filed: Apr. 7, 2006

(65) Prior Publication Data

US 2006/0227746 A1 Oct. 12, 2006

(30) Foreign Application Priority Data

Apr. 9, 2005 (KR) .................. 10-2005-0029748

(51) Int. Cl.
*H04W 4/00* (2009.01)
*H04W 36/00* (2009.01)
(52) U.S. Cl. .................. 370/331; 455/436; 455/437; 455/438
(58) Field of Classification Search ............... 370/311, 370/331; 455/436, 437, 438
See application file for complete search history.

(56) References Cited

U.S. PATENT DOCUMENTS

2004/0233855 A1* 11/2004 Gutierrez et al. ............ 370/338
2006/0092864 A1* 5/2006 Gupta et al. ................ 370/278
2006/0099948 A1* 5/2006 Hoghooghi et al. ......... 455/436

(Continued)

FOREIGN PATENT DOCUMENTS

WO WO 03/079700 A1 9/2003

(Continued)

OTHER PUBLICATIONS

Liu, X. et al.: "Initial Proposal for IEEE 802.21 from Samsung", IEEE 802.21 Working Group [online], Jan. 10, 2005 [retrieved on Jul. 23, 2007]. Retrieved from the Internet: <URL:http://www.ieee802.org/21/doctree/2005-01_meeting_docs/21-04-0171-00-0000-Samsung_MIH_Proposal.doc>, figs. 1, sections 7.1.1-7.3.1, 10.3.2.

(Continued)

*Primary Examiner*—Nick Corsaro
*Assistant Examiner*—Tangela T. Chambers
(74) *Attorney, Agent, or Firm*—Lee, Hong, Degerman, Kang & Waimey

(57) ABSTRACT

The present invention provides a media independent information service (MIIS) for media independent handover (MIH) in a broadband wireless access system. A first lower entity of a mobile station receives a MIH information request primitive requesting a set of information elements provided by the MIIS from a first upper entity of the mobile station. An MIH information request message including an information query list to retrieve the set of information elements is transmitted from the first lower entity to a second lower entity of a base station. An MIH information response message including the set of information elements is received by the first lower entity from the second lower entity in response to the MIH information request message. An MIH information confirmation primitive including the set of information elements is then transmitted from the first lower entity to the first upper entity. The set of information elements includes at least a channel IE representing channel information of a point of attachment (PoA), a quality of service (QoS) IE associated with a QoS level provided by the PoA, or a data rate IE associated with a data transport speed at the PoA.

21 Claims, 12 Drawing Sheets

U.S. PATENT DOCUMENTS

| | | | |
|---|---|---|---|
| 2006/0140150 A1* | 6/2006 | Olvera-Hernandez et al. | 370/331 |
| 2006/0153235 A1* | 7/2006 | Kiernan et al. | 370/469 |
| 2006/0187858 A1* | 8/2006 | Kenichi et al. | 370/254 |
| 2006/0217147 A1* | 9/2006 | Olvera-Hernandez et al. | 370/328 |
| 2006/0251020 A1* | 11/2006 | Olvera-Hernandez et al. | 370/331 |

FOREIGN PATENT DOCUMENTS

| | | |
|---|---|---|
| WO | WO 2004/045081 A2 | 5/2004 |
| WO | WO 2005071866 A1 * | 8/2005 |

OTHER PUBLICATIONS

Gupta, V. et al.: "Media Independent Handover", IEEE 802.21 Working Group [online], Jan. 14, 2005 [retrieved on Jul. 23, 2007)]. Retrieved from the Internet: <URL: htt://www.ieee802.org/21/doctree/2005-01_meeting_docs/21-04-0168-00-0000-Joing_MIH_Proposal_Draft_Text.doc>, figs. 1, 2: pp. 8, 9, 20-25.

Lucent Technologies: "MIH Proposal", IEEE 802.21 Working Group [online], Jan. 17, 2005 [retrieved on Jul. 23, 2007]. Retrieved from the internet:<URL: http://www.ieee802.org/21/doctree/2005-01_meeting_docs/21-05-0202-00-0000-MIH_Proposal_Phase_ii.ppt>. pp. 12, 13, 15-18, 20.

* cited by examiner

WIRELESS SYSTEM FOR COMMUNICATING HETEROGENEOUS NETWORK INFORMATION FOR PERFORMING HANDOVER TO A NETWORK

CROSS-REFERENCE TO RELATED APPLICATIONS

Pursuant to 35 U.S.C. §119(a), this application claims the benefit of earlier filing date and right of priority to Korean Application No. 2005-0029748, filed on Apr. 9, 2005, the contents of which is hereby incorporated by reference herein in its entirety.

FIELD OF THE INVENTION

The present invention relates to providing an information service in a broadband wireless access system, and more particularly, to communicating heterogeneous network information for performing handover to a network.

BACKGROUND OF THE INVENTION

A broadband wireless access system according to a related art will be explained in general as follows. Unlike the conventional 2G or 3G mobile communication systems, an IEEE 802.16e system, for which international standardization of a broadband wireless access system is in progress, is not provided with a hierarchical structure for a home location register (HLR), a visitor location register (VLR), a mobile switching center (MSC), a base station controller (BSC), a radio network controller (RNC) and the like. However, the IEEE 802.16e system includes a mobile subscriber station (MSS) as a mobile terminal, a base station (BS) and an authentication service authorization (ASA) as an authentication managing server. Furthermore a common physical layer (PHY) and a medium access control (MAC) layer are defined between the base station and the mobile subscriber station.

A media independent handover (MIH) technology according to a related art will be explained as follows. An object of an IEEE 802.21 system, in progress for the international standardization of inter-heterogeneous-network media independent handover, is to enhance user convenience for mobile terminal devices by providing seamless handover and service continuity between heterogeneous networks. An MIH function, event trigger, command service and information service (IS) are defined as basic requirements of the IEEE 802.21 system.

A mobile subscriber station is a multi-node that supports at least one interface type, wherein an interface can be implemented in various types. Possible interface types include a wire-line type interface such as an IEEE 802.3-based Ethernet, wireless interface types based on IEEE 802.XX including IEEE 802.11, IEEE 802.15, IEEE 802.16 or the like, and interfaces defined by a cellular standardization organization such as 3GPP and 3GPP2, for example.

FIG. 1 is an exemplary diagram of a multi-mode mobile subscriber station. Referring to FIG. 1, a multi-mode mobile subscriber station includes a physical layer (PHY) per mode and a medium access control (MAC) layer per mode. Furthermore, an MIH layer lies below an IP layer.

Media independent handover (MIH) is defined between IEEE 802-series interfaces or between an IEEE 802-series interface and a non-IEEE 802-series interface, such as a 3GPP or 3GPP2 interface. Also, a mobility supporting protocol of an upper layer such as a Mobile IP and session initiation protocol (SIP) is supported for the seamless handover service.

FIG. 2 is a diagram of a network model for a broadband wireless access system. Referring to FIG. 2, the network model shown represents a logical structure model of the IEEE 802.16 network. A U-interface defines management and control on a radio interface. An M/R interface defines management (M) and radio control (R) between a base station and a mobile subscriber station by a network control and management system (NCMS). An information service for media independent handover (MIH) in a broadband wireless access system can be provided by the NCMS. Alternatively, the NCMS acquires information from an information service (IS) server and then provides the acquired information to the base station or the mobile subscriber station.

FIG. 3 is a diagram of an alternative network model for a broadband wireless access system. Referring to FIG. 3, a base station communicates with the NCMS using primitives or parameters, and not through an M/R interface.

FIG. 4 is a diagram of another network model for a broadband wireless access system. Referring to FIG. 4, a management service access point (Management SAP) preferably performs functions such as system configuration, monitoring statistics, notifications/triggers and the like.

A control service access point (Control SAP) preferably performs the following functions and may further include other functions. The Control SAP may perform a handover function such as a handover notification from a base station, an idle mode mobility management function such as an idle mode entry of a mobile subscriber station, a subscriber and session management function such as a session request creation of a mobile subscriber station, and a radio resource management function, for example.

FIG. 5 is a flowchart of a mobile station initializing procedure in a broadband wireless access system. Referring to FIG. 5, once power of a mobile subscriber station is turned on, the mobile subscriber station searches a downlink channel and acquires uplink/downlink synchronization with a base station (1). The mobile subscriber station adjusts uplink transmission parameters by ranging with the base station, and the base station allocates a basic management connection identifier (CID) and a primary management CID to the mobile subscriber station (2). The mobile subscriber station then negotiates for a basic capability with the base station (3). Afterward, authorization is carried out on the mobile subscriber station (4). The mobile subscriber station then performs a registration procedure to the base station, wherein the base station allocates a secondary management CID to the mobile subscriber station managed by an Internet protocol (IP) (5). Once an IP connection is created (6), a current date and time are set (7). A configuration file of the mobile subscriber station is then downloaded from a trivial file transfer protocol (TFTP) server (8), and a connection for a prepared service is created (9).

An event trigger for handover between heterogeneous networks is explained as follows. For fast handover, a network layer uses information from a link layer to re-establish a connection as soon as possible. A link layer event helps to estimate a user's movement and may help a mobile subscriber station and network prepare the handover in advance. A trigger for handover may begin with a physical layer (PHY) and a medium access control layer (MAC). An origin of this trigger may be a local stack or a remote stack.

FIG. 6 is a diagram of a trigger model. An event trigger provides a state of a current signal, a state change of another network and an estimated change. The event trigger also provides a change between a physical layer and a medium access control layer, and attribute changes of a specific network.

Event types can be classified into the following: (1) PHY layer event; (2) MAC layer event; (3) Management event; (4) L3 event; and (5) Application event Basic trigger events are explained as follows. A "Link_Up" event occurs when a Layer 2 (L2) connection is established on a specific link interface and when Layer 3 (L3) packets can be transferred from a higher layer. In this case, it is decided that all Layer 2 configurations configuring the link are completed. Event origins are a Local MAC and a Remote MAC. Corresponding parameters are shown in Table 1.

TABLE 1

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |
| NetworkIdentifier | Media Specific | Network Identifier usable in detecting change of subnet |
| IP_Renewal_Indicator | | Indicating necessity of changing temporary IP address. 0: change unnecessary 1: change necessary |

A "Link Down" event occurs when an L2 connection is released on a specific interface and L3 packets can no longer be transferred. An event origin is a Local MAC. Corresponding parameters are shown in Table 2.

TABLE 2

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| ReasonCode | | Reason why link is released |

A "Link Going Down" event occurs when it is estimated that an L2 connection is going to link down within a specific time. The "Link Going Down" event may be a signal for initializing a handover procedure. Event origins are a Local MAC and a Remote MAC. Corresponding parameters are shown in Table 3.

TABLE 3

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |
| TimeInterval | Time in msecs | Estimated time for Link_Up |
| ConfidenceLevel | % | Estimated level for Link_Down of link in a specific time |
| UniqueEventIdentifier | | Used in case that Event rollback occurs |

A "Link Going Up" event occurs when it is estimated that an L2 connection is going to link up within a specific time. The "Link Going Up" event is used when a lengthy amount of time is needed to initialize a network. Event origins are a Local MAC and a Remote MAC. Corresponding parameters are shown in Table 4.

TABLE 4

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |
| TimeInterval | Time in msecs | Estimated time for Link_Up |
| ConfidenceLevel | % | Estimated level for Link_Up of link in a specific time |
| UniqueEventIdentifier | | Used in case that Event rollback occurs |

A "Link_Available" event indicates that a new specific link is usable or available. The "Link_Available" event indicates the possibility that a new base station or access point can provide better link quality than that of a current base station or access point accessed by a mobile subscriber station. Event origins are a Local MAC and a Remote MAC. Corresponding parameters are shown in Table 5.

TABLE 5

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |
| IP_Renewal_Indicator | | Indicating necessity of changing temporary IP address. 0: change unnecessary 1: change necessary |

A "Clear_Oldlink_Connection" event is explained as follows. If a link connection of a new medium access control layer is created, a mobile subscriber station triggers the "Clear_Oldlink_Connection" event to release a link connection of an old medium access control layer. An event origin is an MIH. Corresponding parameters are shown in Table 6.

TABLE 6

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |

An information service for inter-heterogeneous-network handover is explained as follows. A media independent information service (MIIS) provides a similar frame network on a hierarchical heterogeneous network to facilitate discovery and selection of various kinds of present networks. Namely, the media independent information service (MIIS) provides detailed information about a network needed to search and select the network. The MIIS should be accessible from any of the various kinds of networks and include information elements such as link access parameter, security mechanism, neighbor map, location, provider information, other access information, and cost of link, for example.

FIG. 7 is a flowchart of a procedure for acquiring an information service according to a related art. Referring to FIG. 7, an MIH of a mobile subscriber station (MS) transfers an MIH_info.request message to its MAC to request an information service (S710). The MAC of the mobile subscriber station then transfers an information request frame to a base station (BS) (S720). A MAC of the base station delivers the information request from the mobile subscriber station to its MIH via an MIH_Info.indication message (S730). The MIH of the base station then delivers a retained media independent information service to the MAC layer via a MIH_Info.response message (S740). This enables the MAC of the base station to send an information response frame in response to the mobile subscriber station (S750). The MAC of the mobile subscriber station receives the information response frame and delivers contents of the received information service to its MIH via an MIH_Info.confirm message (S760).

However, when a currently operating multi-mode mobile subscriber station in a broadband wireless access system performs media independent handover to another interface network, as shown in the flowchart of FIG. 7, providing an information service to the multi-mode mobile subscriber station is problematic because a method for exchanging an information service between a base station and an information service (IS) server is not clearly defined. Moreover, MAC management messages for transmitting and receiving service request and response messages between a base station and a mobile subscriber station are not defined.

Accordingly, what is needed is an invention for transmitting and receiving an information service for media independent handover that resolves the problems of the related art.

SUMMARY OF THE INVENTION

The present invention is directed to communicating heterogeneous network information for performing handover to a network.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method of communicating heterogeneous network information for performing a handover to a network, the method comprising generating a request message from a heterogeneous network handover module to a medium access control (MAC) of the mobile terminal, wherein the heterogeneous network handover module is configured to provide convergence of information from at least one network interface module associated with one of a homogeneous and heterogeneous network into a unified presentation, transmitting an information request associated with heterogeneous networks to a serving network, wherein the information request comprises the request message from the heterogeneous network handover module, and receiving an information response from the serving network configured to communicate with a network control and management system (NCMS) associated with the heterogeneous networks, wherein the information response is prepared in response to queried information obtained from the NCMS.

In one aspect of the invention, the queried information from the NCMS comprises at least one of position information of a point of attachment (POA), an access router IP address of the POA, a list of operators, a list of neighboring POAs, channel information of the POA, and a quality of service of the POA.

In another aspect of the invention, the serving network and the NCMS are integrally connected to communicate with primitives. Alternatively, the serving network and the NCMS are separate entities communicating through an interface.

In a further aspect of the invention, the information response from the serving network is prepared by a medium access control of the serving network in response to the queried information received from a heterogeneous network handover module of the serving network.

In accordance with another embodiment of the present invention, a mobile terminal for communicating heterogeneous network information for performing a handover to a network comprises a heterogeneous network handover module for generating and communicating heterogeneous network information, wherein the heterogeneous network handover module is configured to provide convergence of information from at least one network interface module associated with one of a homogeneous and heterogeneous network into a unified presentation, and a medium access control (MAC) for communicating heterogeneous network information, wherein a request message generated from the heterogeneous network handover module is communicated to the MAC, wherein the MAC transmits an information request associated with heterogeneous networks to a serving network, the information request comprising the request message from the heterogeneous network handover module, wherein the MAC receives an information response from the serving network configured to communicate with a network control and management system (NCMS) associated with the heterogeneous networks, wherein the information response is prepared in response to queried information obtained from the NCMS.

In one aspect of the invention, the queried information from the NCMS comprises at least one of position information of a point of attachment (POA), an access router IP address of the POA, a list of operators, a list of neighboring POAs, channel information of the POA, and a quality of service of the POA.

In another aspect of the invention, the serving network and the NCMS are integrally connected to communicate with primitives. Alternatively, the serving network and the NCMS are separate entities communicating through an interface.

In a further aspect of the invention, the information response from the serving network is prepared by a medium access control of the serving network in response to the queried information received from a heterogeneous network handover module of the serving network.

In accordance with another embodiment of the present invention, a method of communicating heterogeneous network information for assisting a handover in a wireless communication system comprises generating a query message from a heterogeneous network handover module of a serving network to a network control and management system (NCMS) associated with the heterogeneous networks, wherein the heterogeneous network handover module of the serving network is configured to communicate with a heterogeneous network handover module of a mobile terminal capable of providing convergence of information into a unified presentation, receiving a query confirmation from the NCMS to the heterogeneous network handover module of the serving network, providing the query confirmation to a medium access control of the serving network, and transmitting an information response from the serving network, wherein the information response comprises the query confirmation obtained from the NCMS.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
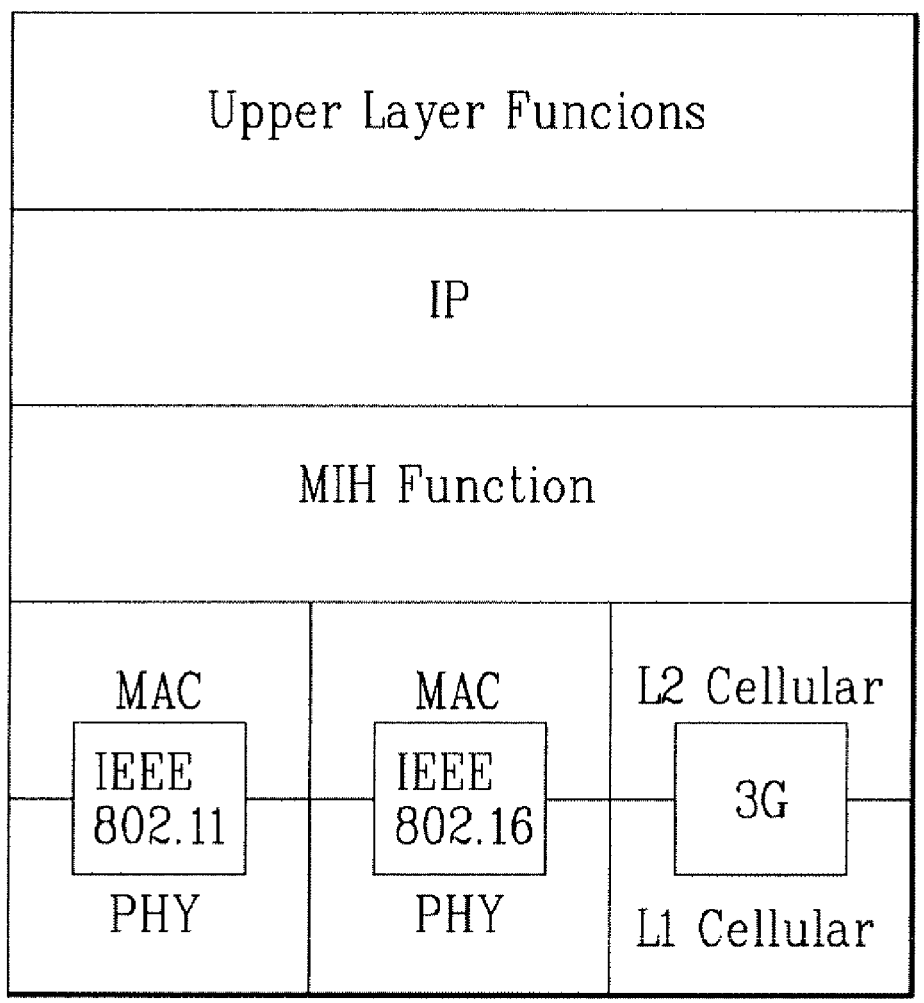
FIG. 1 is an exemplary diagram of a multi-mode mobile subscriber station.
Figure 2:
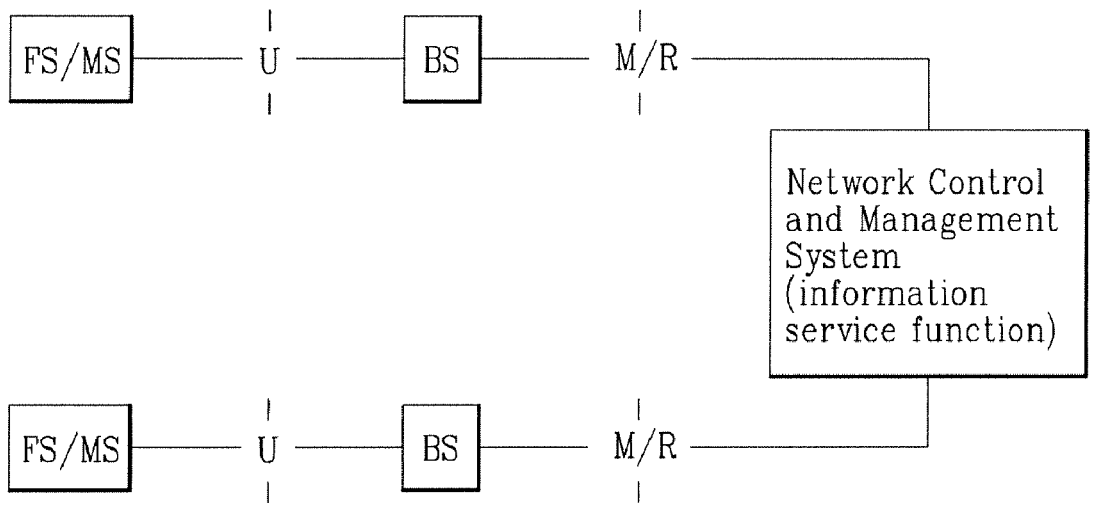
FIG. 2 is a diagram of a network model for a broadband wireless access system.
Figure 3:
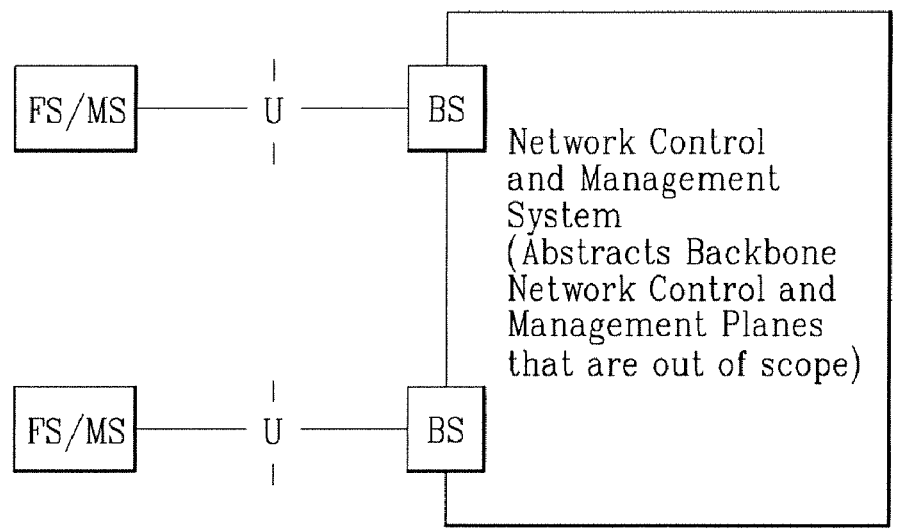
FIG. 3 is a diagram of an alternative network model for a broadband wireless access system.
Figure 4:
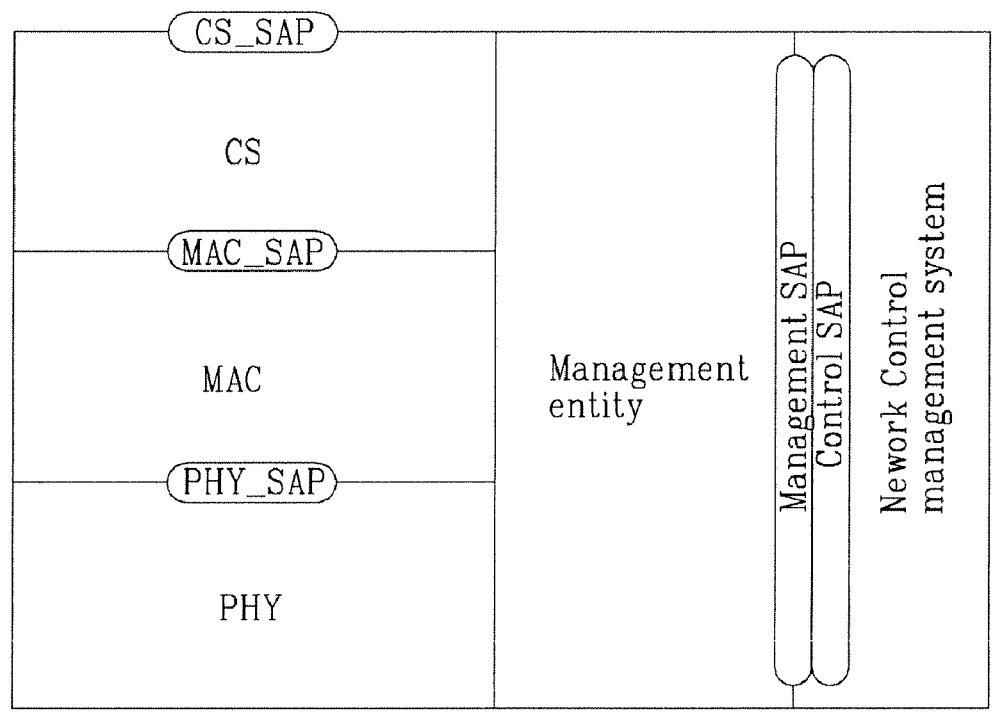
FIG. 4 is a diagram of another network model for a broadband wireless access system.
Figure 5:
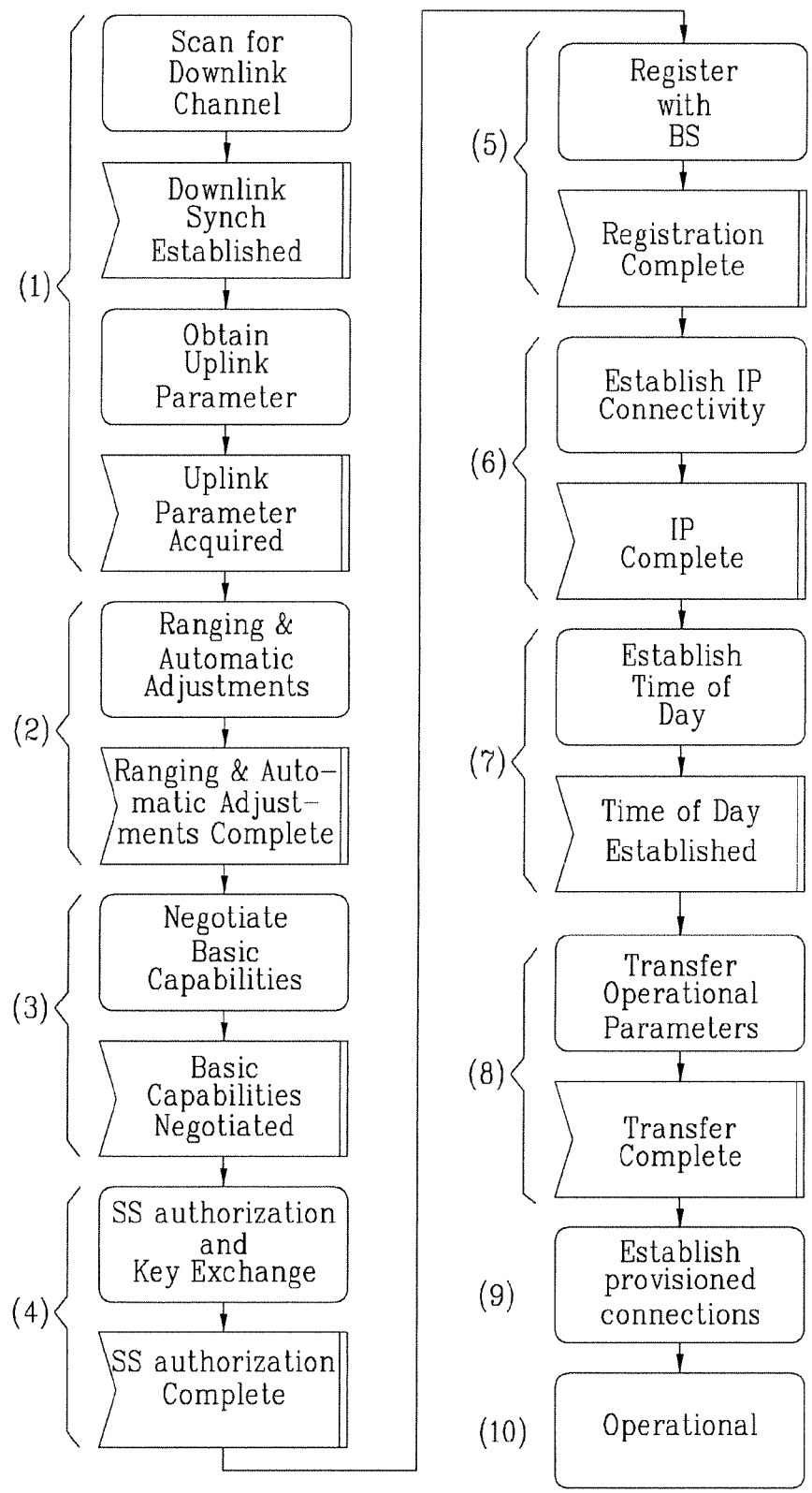
FIG. 5 is a flowchart of a mobile subscriber station initializing procedure in a broadband wireless access system.
Figure 6:
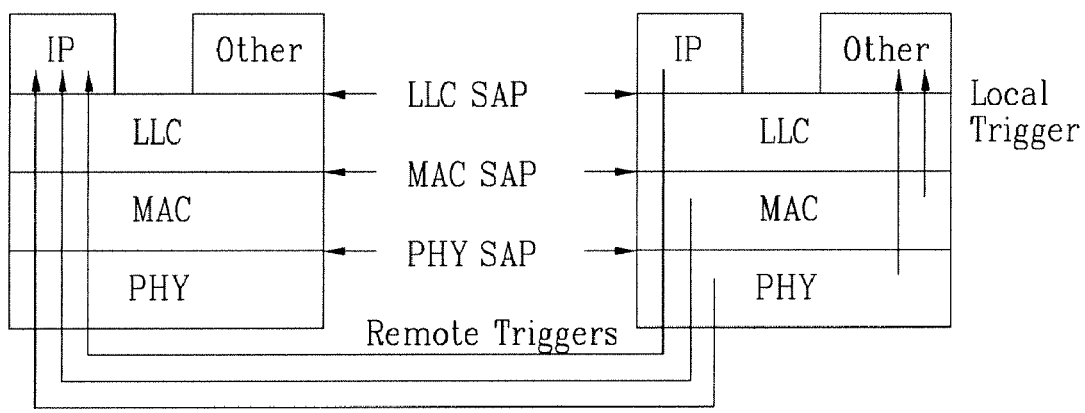
FIG. 6 is a diagram of a trigger model.
Figure 7:
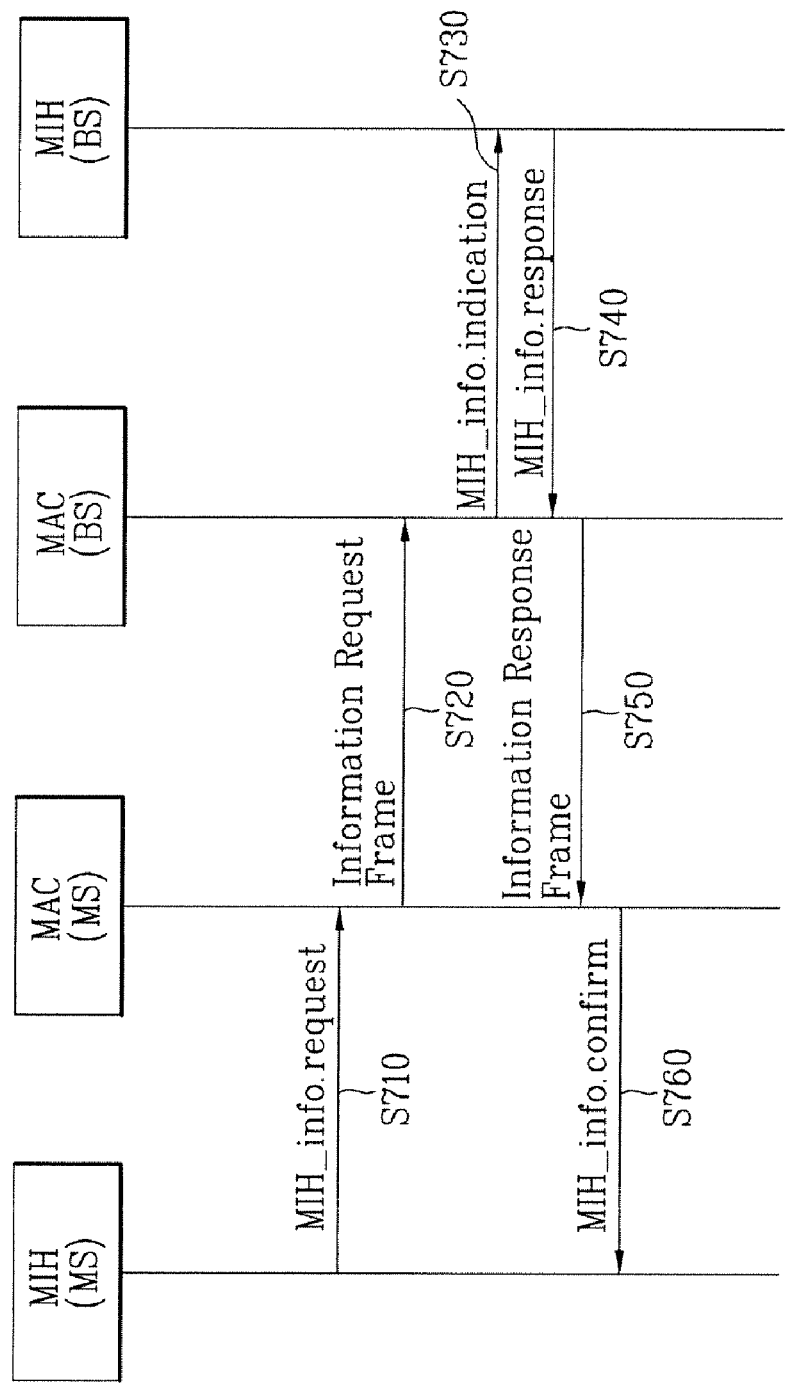
FIG. 7 is a flowchart of a procedure for acquiring an information service in accordance with a related art.

The present invention relates to communicating heterogeneous network information for performing handover to a network. Reference will now be made in detail to the preferred embodiments of the present invention, examples of which are illustrated in the accompanying drawings. Wherever possible, the same reference numbers will be used throughout the drawings to refer to the same or like parts.

Preferably, the present invention relates to transmitting and receiving an information service between a mobile subscriber station (MSS) and a base station (BS) in a system where at least one of a broadband wireless access system, a wireless LAN and a cellular network is operated. No limitation is put on a type of the broadband wireless access system, wireless LAN and cellular network. For example, the wireless LAN may employ an IEEE 802.11 system, and the cellular network may employ a system defined by a standardization organization such as 3GPP and 3GPP2.

The present invention provides an information service including information elements associated with a network, a link layer and an upper layer. Referring to Table 7, information elements provided by an information service in accordance with one preferred embodiment of the present invention are explained.

TABLE 7

| Information Element | Usage |
| --- | --- |
| Network Associated IE | |
| Location | Position information of Point of Attachment (POA) |
| Network Address | Access Router IP address of POA |
| Network standards supported | IP version of network provided by Access Router of POA ex.) 0: IPv4, 1: IPv6 |
| Operator | Provider identification of network to which POA belongs |
| Link Layer Associated Information | |
| Channel | Channel information of POA |
| PHY Type | Physical layer information of POA |
| Data rates | Data transport speed at POA |
| Neighbor lists | List for other POAs neighbor to POA |
| Security | EAP (extensible authentication protocol) & PKM associated information |
| Quality of Service | QoS level provided by POA |
| MIH Capability | Indicating whether POA provides MIH Function. (Yet, this information is included only if a current MSS is provided with an information service for a new POA by an MIH-available POA.) |
| Upper Layer Associated Information | |
| MMS Supported | Indicating whether MMS (multimedia message service) is available |
| IMS Supported | Indicating whether IMS (IP multimedia service) is available |
| ISP Supported | Indicating whether network provides Internet connection service |
| VPN Supported | Indicating whether VPN (virtual private network) is available |
| Mobility Management Protocol Type | Indicating Mobility Management Protocol Type provided by POA 0: MIPv4 1: MIPv6 2: SIP 3: SCTP |
| Foreign Agent Supported | Indicating FA (Foreign Agent) Information if MIPv4 is used as Mobility Management Protocol |
| NAT Supported | Indicating whether corresponding POA provides NAT (Network Address Translation) service |

An Information Request message (MOB-INFO-REQ) is explained as follows. This message is transferred to a management connection identifier (CID) (e.g., Basic CID or Primary Management CID) to request an information service from a base station currently accessed by a mobile subscriber station. Table 8 shows one embodiment of the MOB-INFO-REQ message. Each bit in an Information Request Bitmap indicates a corresponding information service that can be requested by a mobile subscriber station. Bits set to 1 indicate information that is requested.

TABLE 8

| Syntax | Size | Notes |
|---|---|---|
| MOB-INFO-REQ( ) { | | |
| Management message type = XX | 1 byte | |
| Information Request Bitmap | 3 bytes | Bits set to 1 indicate that a corresponding information service is requested.<br>Only 18th bit is set to 1 if all information services are requested.<br>Bit #0: Location<br>Bit #1: Network Address<br>Bit #2: Network standards information<br>Bit #3: Operator<br>Bit #4: Channel<br>Bit #5: PHY Type<br>Bit #6: Data rates<br>Bit #7: Neighbor lists<br>Bit #8: Security<br>Bit #9: Quality of Service<br>Bit #10: MIH Capability<br>Bit #11: MMS Supported<br>Bit #12: IMS Supported<br>Bit #13: ISP Supported<br>Bit #14: VPN Supported<br>Bit #15: Mobility Management Protocol Type<br>Bit #16: Foreign Agent Supported<br>Bit #17: NAT Supported<br>Bit #18: All information request<br>Bit #19 to Bit #23: Reserved |
| } | | |

An Information Request Response message (MOB-INFO-RSP) is explained as follows. The base station having received the MOB-INFO-REQ message from the mobile subscriber station sends a MOB-INFO-RSP message in response to the corresponding information requested by the mobile subscriber station. This is transferred to a management connection identifier (e.g., Basic CID or Primary Management CID). Table 9 shows one embodiment of the MOB-INFO-RSP message, in which information not requested by the mobile subscriber station can be excluded in part. Furthermore, even if the mobile subscriber station does not send the request message, the response message may be unsolicitedly and periodically transmitted to the mobile subscriber station from the base station by broadcasting or unicasting.

TABLE 9

| Syntax | Size | Notes |
|---|---|---|
| MOB-INFO-RSP( ) { | | |
| Management message type = XX | 8 bits | |
| N_PoA | 8 bits | No. of neighbor POAs enabling handover of MSS |
| For(i=1 ; i<=N_PoA ; i++) { | | |
| PoA Interface type | 8 bits | Indicating interface type of POA<br>0b000: IEEE 802.3<br>0b001: IEEE 802.11<br>0b010: IEEE 802.16<br>0b011: IEEE 802.15<br>0b100: 3GPP<br>0b101: 3GPP2<br>0b110 to 0b111: reserved |

TABLE 9-continued

| Syntax | Size | Notes |
|---|---|---|
| Location | 48 bits | MAC add |
| Network Address | 128 bits | Access Router IP Address of POA |
| Network standards supported | 2 bits | 0b00: IPv4<br>0b01: IPv6<br>0b02–0b03: reserved |
| Operator ID | 24 bits | Provider Identification of POA-neighboring network |
| Channel | | Indicating channel information of POA |
| PHY Type | 3 bits | 0b000: OFDM<br>0b001: OFDMA<br>0b002: Single Carrier |
| Data rates | | Data transport speed at POA |
| Security | | PKM and EAP information at POA |
| Quality of Service Level | 2 bits | 0b00: First Class<br>0b01: Second Class<br>0b10: Third Class<br>0b11: Fourth Class |
| MIH Capability | 1 bit | 0: MIH disabled<br>1: MIH: enabled |
| MMS Supported | 1 bit | 0: MMS supported<br>1: MMS not supported |
| IMS Supported | 1 bit | 0: IMS supported<br>1: IMS not supported |
| ISP Supported | 1 bit | 0: ISP supported<br>1: ISP not supported |
| VPN Supported | 1 bit | 0: VPN supported<br>1: VPN not supported |
| Mobility Management Protocol Type | 8 bits | 0b000: MIPv4<br>0b001: MIPv6<br>0b010: SIP<br>0b011: SCTP<br>0b100–0b111: reserved |
| Foreign Agent Supported<br>If (Mobility Management Protocol<br>Type == 0b000)<br>{<br>Foreign Agent Supported | 1 bit | 0: Foreign Agent supported<br>1: Foreign Agent not supported |
| }<br>NAT Supported | 1 bit | 0: NAT supported<br>1: NAT not supported |
| }<br>} | | |

An Information.query.request primitive will now be explained. This primitive is transferred so that a MAC layer of a base station can periodically request an information service from an information service server. Semantics of the primitive are explained as follows.

```
Information_query.request
{
Source,
Destination,
QueryField,
QueryParameter,
QueryID
}
```

Table 10 shows names and descriptions of a query.

TABLE 10

| Name | Type | Valid Range | Description |
|---|---|---|---|
| Source | | | Start point of request |
| Destination | | | Target point to which request is delivered |
| QueryField | | | Query request field |
| QueryParameter | | | Query request parameter |
| QueryID | | | Query message identifier |

A creation timing point of the primitive will now be explained. This primitive is created so that a base station can query an information service to an information service server to continuously keep the latest data of the information service.

Effect of receipt is explained as follows. An information service server searches its database for a corresponding query field and then transfers a response message.

A function and semantics of an Information_query.confirm primitive are explained as follows.

\* Function

After an information service server has received the Information_query.request primitive, an Information_query.confirm primitive is transferred in response to the received Information_query.request primitive.

```
Information_query.confirm
{
Source,
Destination,
QueryField,
Datafield 1,
Datafield 2,
...
Datafield n,
QueryID
}
```

Table 11 shows names and descriptions of a query.

TABLE 11

| Name | Type | Valid Range | Description |
|------|------|-------------|-------------|
| Source | | | Start point of confirm |
| Destination | | | Target point to which confirm is delivered |
| QueryField | | | Query request field |
| Datafield | | | Data field |
| QueryID | | | Query message identifier |

A method of providing an information service in a broadband wireless access system using MAC messages and primitives in accordance with one preferred embodiment of the present invention will now be explained. The present invention may be described according to the following cases.

First, when a multi-mode mobile subscriber station connected to a base station in a broadband wireless access system acquires an information service for access points of another interface network (e.g., wireless LAN, wired LAN, cellular system) via the currently accessed base station of the broadband wireless access system, the mobile subscriber station transmits an information service request message to receive a response. Otherwise, the mobile subscriber station is unsolicitedly provided with a broadcast or unicast message by the base station despite the mobile subscriber station not transmitting the request message.

Second, when a mobile subscriber station connected to another interface network acquires an information service from a base station of a broadband wireless access system after having created a new connection by attempting handover to the base station of the broadband wireless access system, the mobile subscriber station transmits an information service request message to receive a response. Otherwise, the mobile subscriber station is unsolicitedly provided with a broadcast or unicast message by the base station despite the mobile subscriber station not transmitting the request message.

Figure 8:
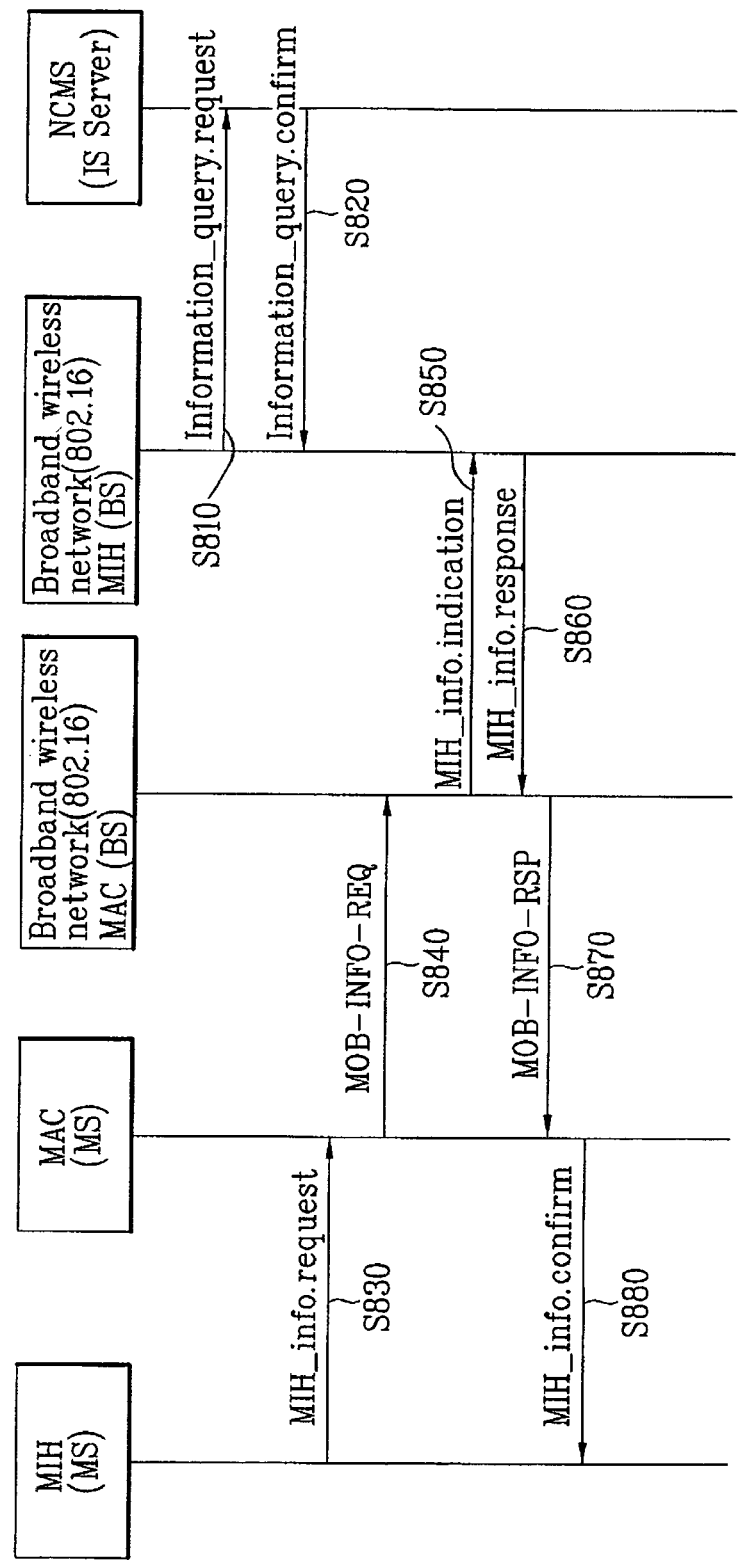
FIG. 8 is a flowchart of a procedure for acquiring an information service from a current access point (AP) or point of attachment (POA) for another interface network in a broadband wireless access system, in accordance with one embodiment of the present invention.

FIG. 8 is a flowchart of a procedure for acquiring an information service from a current access point (AP) or point of attachment (POA) for another interface network in a broadband wireless access system. Preferably, a multi-mode mobile subscriber station operating in a broadband wireless access system acquires an information service for access points of another interface network from a base station of the broadband wireless access system via a request message of the mobile subscriber station and in which an information service (IS) server function is placed in a network control and management system (NCMS).

Referring to FIG. 8, an MIH of a base station transfers an Information_query.request primitive to an NCMS, either periodically or by some event, to acquire an information service associated with media independent handover (S810).

In one aspect of the invention, an IS server function may be included in the base station. Accordingly, the information service request may be executed within the base station. With regard to an IS server existing within the NCMS, the IS server transfers the information service to the MIH of the base station via an Information_query.confirm message (S820). However, as stated above, the IS server function may be included in the base station. Accordingly, the transfer of the information service may be executed within the base station.

An MIH of a mobile subscriber station transfers an MIH_Info.request message to its MAC layer to acquire the information service (S830). The MAC layer of the mobile subscriber station then transmits a MOB-INFO-REQ message to the base station (S840). Accordingly, a MAC layer of the base station delivers an information request made by the mobile subscriber station to its MIH via an MIH_info.indication message (S850). The MIH of the base station then responds to the request with the retained information service via an MIH_info.response message (S860). Finally, the MAC layer of the base station transmits the information service to the mobile subscriber station via a MOB-INFO-RSP message (S870), wherein the MAC layer of the mobile subscriber station delivers the information service to its MIH (MIH_info.confirm) (S880).

In the following embodiment of the present invention, a mobile subscriber station operating in a wireless LAN attempts handover to a broadband wireless access system in order to be provided with an information service from the broadband wireless access system. As mentioned in the foregoing description, the present invention relates to a system operating at least one of a broadband wireless network, a wireless LAN and a cellular system network. Therefore, a mobile subscriber station operating in the cellular system network or the like, as well as in the wireless LAN, can be provided with an information service. Preferably, the wireless LAN is an IEEE 802.11 system. Preferably, the broadband wireless access system is an IEEE 802.16 system.

Figure 9:
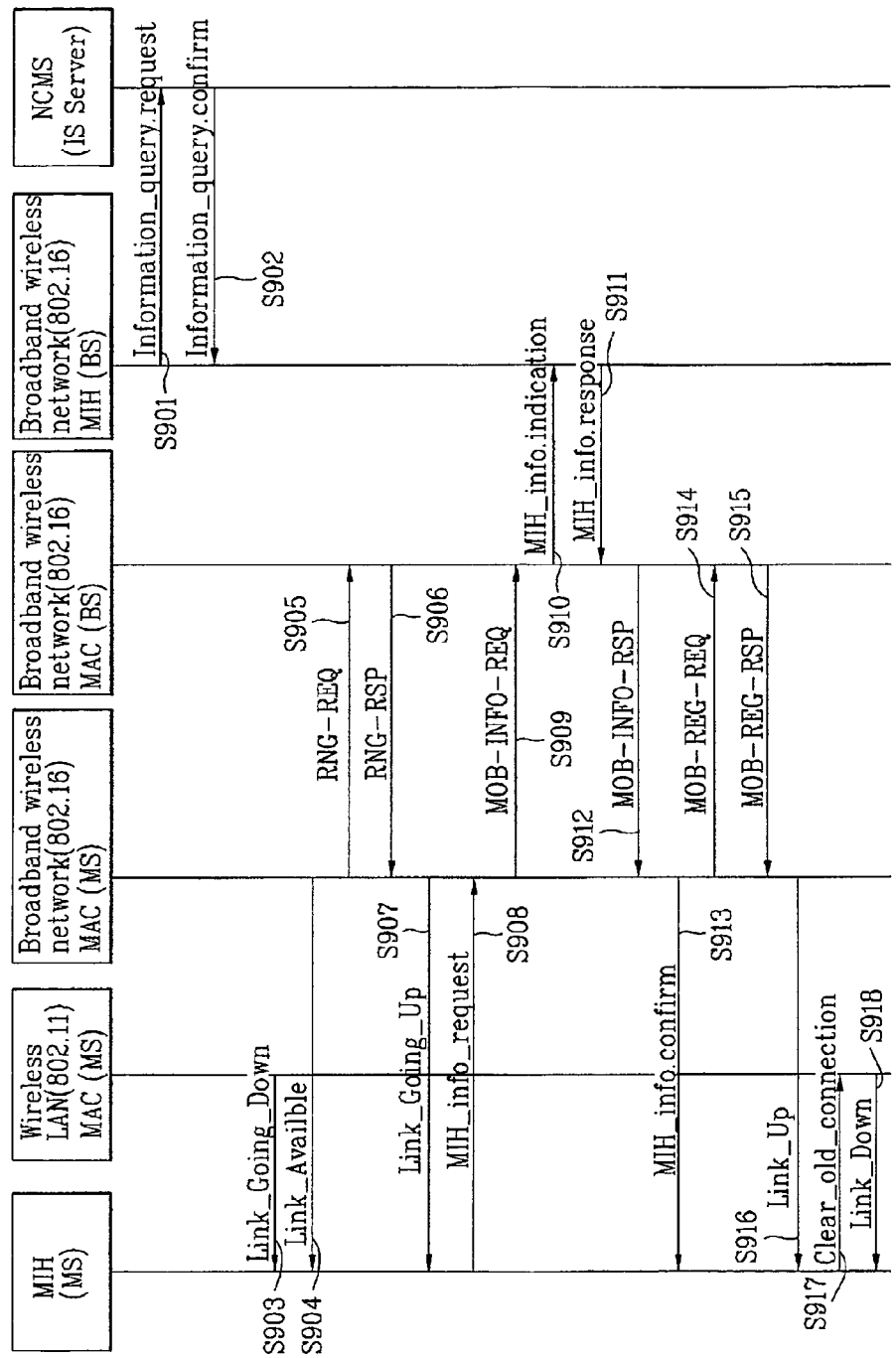
FIG. 9 is a flowchart of a procedure for acquiring an information service for a current network from a new AP or POA of a broadband wireless access system via a request message of a mobile subscriber station, in accordance with one embodiment of the present invention.

FIG. 9 illustrates one embodiment of the present invention, wherein a mobile subscriber station operating in an IEEE 802.11 system creates a new connection by attempting handover to a base station of a broadband wireless access system. The mobile subscriber station is then provided with an information service associated with a network from a base station of the broadband wireless access system using its request message. Preferably, the mobile subscriber station is a multi-mode mobile terminal including a wireless LAN interface and a broadband wireless access system interface.

Referring to FIG. 9, an MIH of a base station of a broadband wireless access system transfers an Information_query.request to an NCMS, either periodically or by some event, to acquire an information service associated with media independent handover (S901). In one aspect of the invention, an IS server function may be included in the base station. In such a case, the information service request may be executed within the base station. With regard to an IS server existing within the NCMS, the IS server transfers the information service to the MIH of the base station via an Information_query.confirm (S902). However, as stated above, the IS server function may be included in the base station. Accordingly, the transfer of the information service may be executed within the base station.

Meanwhile, an MIH of a mobile subscriber station receives a Link_Going_Down trigger from a wireless LAN MAC and searches for a new link (S903). A broadband wireless access system MAC of the mobile subscriber station then transmits a Link_Available trigger to the MIH of the mobile subscriber station (S904). Subsequently, the broadband wireless access system MAC of the mobile subscriber station transmits a range request (RNG-REQ) message to create a connection to the base station of the broadband wireless access system (S905).

In response, the base station sends a range response (RNG-RSP) message of success to the broadband wireless system MAC of the mobile subscriber station (S906). The broadband wireless access system MAC then transmits a Link_Going_Up trigger to the MIH of the mobile subscriber station (S907).

Accordingly, the MIH of the mobile subscriber station transfers an MIH_info.request to its MAC layer to acquire an information service for a current network (S908). The broadband wireless access system MAC layer of the mobile subscriber station then transmits a MOB-INFO-REQ message to the base station of the broadband wireless access system (S909).

A MAC layer of the broadband wireless access system base station delivers an information request made by the mobile subscriber station to its MIH via an MIH_info.indication (S910). The MIH of the broadband wireless access system base station then responds to the request with the retained information service via an MIH_info.response (S911). Afterward, the MAC layer of the base station transmits the information service to the mobile subscriber station via an MOB-INFO-RSP message (S912).

The broadband wireless access system MAC layer of the mobile subscriber station delivers the information service to its MIH (S913). The broadband wireless access system MAC of the mobile subscriber station also transmits a registration request message (MOB-REG-REQ) to the base station (S914). In response, the base station sends back a registration response message (MOB-REG-RSP) (S915).

Upon receiving the registration response message from the base station, the broadband wireless access system MAC of the mobile subscriber station transmits a Link_Up trigger to the MIH of the mobile subscriber station (S916). The MIH of the mobile subscriber station then transfers a Clear_old_connection message to the wireless LAN MAC to order the release of a corresponding link (S917). After releasing the corresponding link, the wireless LAN MAC transmits a Link_Down trigger to the MIH of the mobile subscriber station (S918).

In the following embodiment of the present invention, a mobile subscriber station operating in a broadband wireless access system is provided with an information service of another interface network by a broadband wireless network. Preferably, the broadband wireless access system is an IEEE 802.16 system.

Figure 10:
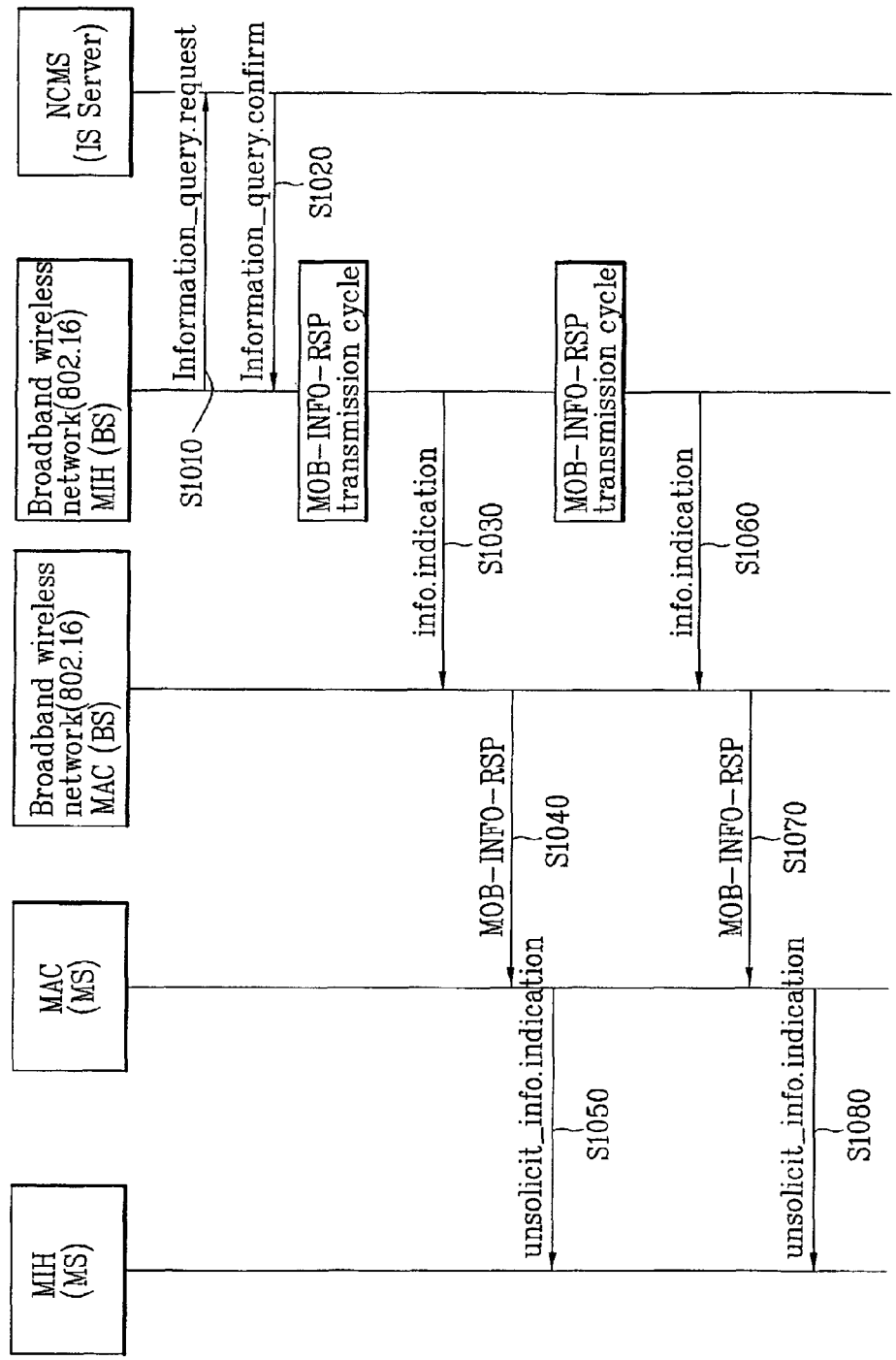
FIG. 10 is a flowchart of a procedure for acquiring an information service for another interface network from a current AP or POA of a broadband wireless access system via a broadcast message, in accordance with one embodiment of the present invention.

FIG. 10 is a flowchart of a procedure for acquiring an information service for access points of another interface network from a base station of a broadband wireless access system via a broadcast message from the base station. Preferably, an information service (IS) server function is included in an NCMS.

Referring to FIG. 10, an MIH of a base station transfers an Information_query.request to the NCMS, either periodically or by some event, to acquire an information service associated with media independent handover (S1010). In one aspect of the invention, the IS server function may be included in the base station. In such a case, the information service request may be executed within the base station. With regard to the IS server existing within the NCMS, the IS server transfers the information service to the MIH of the base station via an Information_query.confirm (S1020). However, as stated above, the IS server function may be included in the base station. Accordingly, the transfer of the information service may be executed within the base station.

When a timing point for transmitting a MOB-INFO-RSP broadcasting message arrives, the MIH of the base station transfers an info.indication message to its MAC layer (S1030) to order the MAC layer to transmit a MOB-INFO-RSP message to a MAC layer of the mobile subscriber station (S1040). In this case, information included in the info.indication message is equal to the parameters of the MIH_info.response message explained in FIG. 8. Preferably, the MAC of the base station broadcasts the MOB-INFO-RSP message (S1040).

A MAC of the mobile subscriber station delivers information of the received MOB-INFO-RSP message to the MIH of the mobile subscriber station via an unsolicit_info_indication message (S1050). Preferably, information included in the unsolicit_info_indication is equal to the parameters of the MIH_info.confirm explained in FIG. 8. Steps S1060 to S1080 represent an example of broadcasting a broadcasting message periodically.

In the following embodiment of the present invention, a mobile subscriber station operating in a wireless LAN attempts handover to a broadband wireless network in order to be provided with an information service from the broadband wireless network. As mentioned in the foregoing description, the present invention relates to a system operating at least one of a broadband wireless network, a wireless LAN and a cellular system network. Therefore, a mobile subscriber station operating in the cellular system network or the like, as well as in the wireless LAN, can be provided with an information service. Preferably, the wireless LAN is an IEEE 802.11 system and the broadband wireless network is an IEEE 802.16 system.

Figure 11:
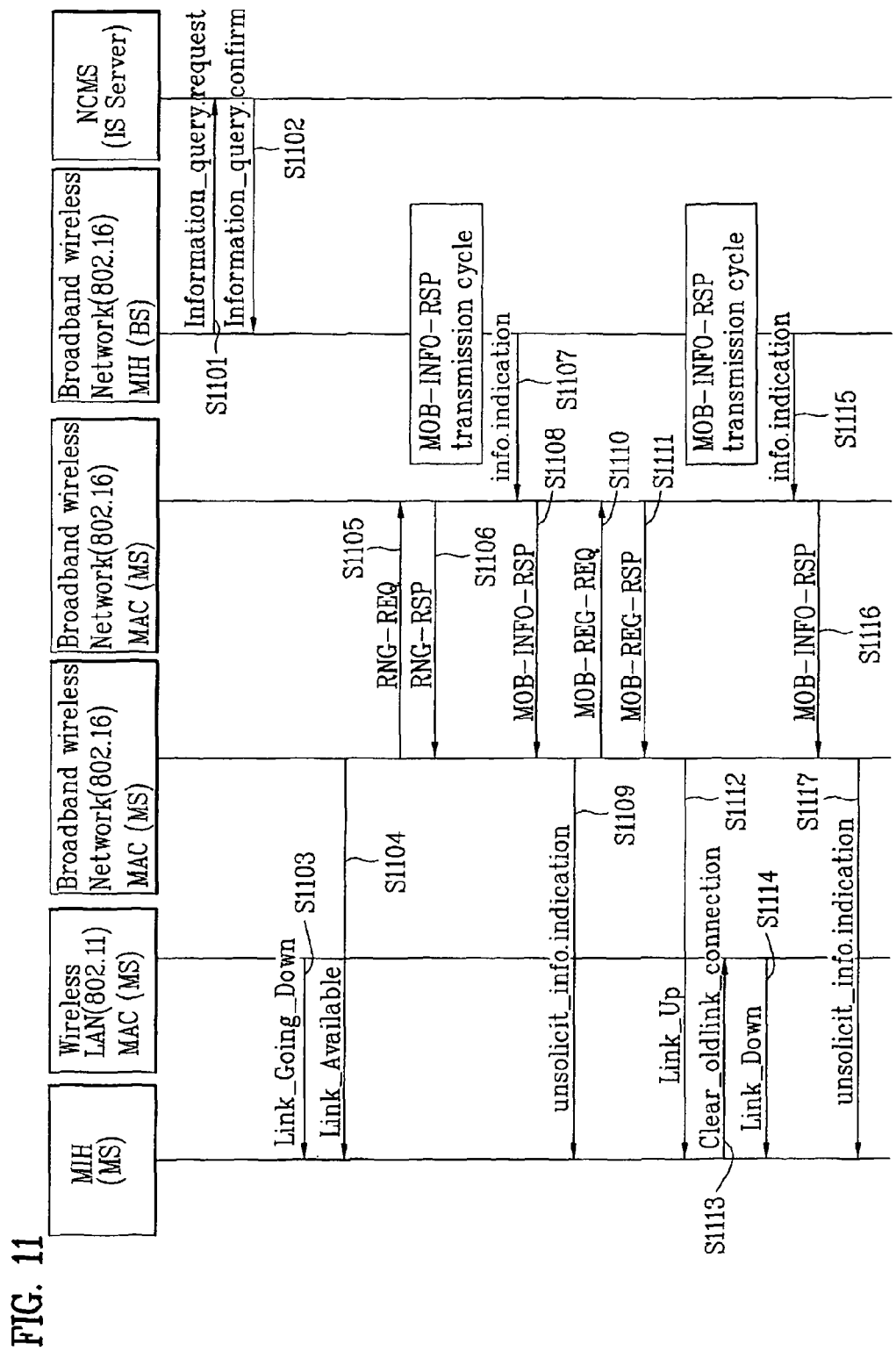
FIG. 11 is a flowchart of a procedure for acquiring an information service for a current network from a new AP or POA of a broadband wireless access system via a broadcast message, in accordance with one embodiment of the present invention.

FIG. 11 shows one embodiment of the present invention, wherein a mobile subscriber station operating in a wireless LAN system creates a new connection by attempting handover to a base station of a broadband wireless access system. The mobile subscriber station is then provided with an information service associated with a network from a base station of the broadband wireless access system using its request message.

Referring to FIG. 11, an MIH of a base station of a broadband wireless access system transfers an Information_query.request to an NCMS, either periodically or by some event, to acquire an information service associated with media independent handover (S1101). In one aspect of the invention, an IS server function may be included in the base station. In such a case, the information service request may be executed within the base station. With regard to the IS server existing within the NCMS, the IS server transfers the information service to the MIH of the base station via an Information_query.confirm (S1102). However, as stated above, the IS server function may be included in the base station. Accordingly, the transfer of the information service may be executed within the base station.

Meanwhile, an MIH of a mobile subscriber station receives a Link_Going_Down trigger from a wireless LAN MAC and searches for a new link (S1103). A broadband wireless access system MAC of the mobile subscriber station then transfers a Link_Available trigger to the MIH of the mobile subscriber station (S1104). Subsequently, the broadband wireless access system MAC of the mobile subscriber station transmits a range request (RNG-REQ) message to a broadband wireless access system MAC of a base station to create a connection with the base station (S1105). In response, the base station sends back a range response (RNG-RSP) message of success (S1106).

When a timing point for transmitting a MOB-INFO-RSP broadcasting message arrives, the MIH of the base station transfers an info.indication to the MAC layer of the base station (S1107) to order the MAC layer to transmit the MOB-INFO-RSP message (S1108). Preferably, information included in the info.indication is equal to the parameters of the MIH_info.response explained in FIG. 8. Preferably, the MAC of the base station broadcasts the MOB-INFO-RSP message.

A broadband wireless access system MAC of the mobile subscriber station delivers information of the received MOB-INFO-RSP message to the MIH of the mobile subscriber station via an unsolicit_info_indication (S1109). Preferably, information included in the unsolicit_info_indication is equal to the parameters of the MIH_info.confirm explained in FIG. 8.

The broadband wireless access system MAC layer of the mobile subscriber station then transmits a registration request message (MOB-REG-REQ) to the base station of the broadband wireless access system (S1110). In response, the base station sends back a registration response message (MOB-REG-RSP) (S1111).

Upon receiving the registration response message from the base station, the broadband wireless access system MAC of the mobile subscriber station transmits a Link_Up trigger to the MIH of the mobile subscriber station (S1112). The MIH of the mobile subscriber station then transfers a Clear_old-link_connection message to the wireless LAN MAC to order the release of a corresponding link (S1113). After releasing the corresponding link, the wireless LAN MAC transmits a Link_Down trigger to the MIH of the mobile subscriber station (S1114). Steps S115 to S1117 represent an example of broadcasting a broadcasting message periodically.

In the following embodiment of the present invention, a mobile subscriber station operating in a broadband wireless access system is provided with an information service of another interface network from a wireless access system. Preferably, the wireless access system is an IEEE 802.16 system.

Figure 12:
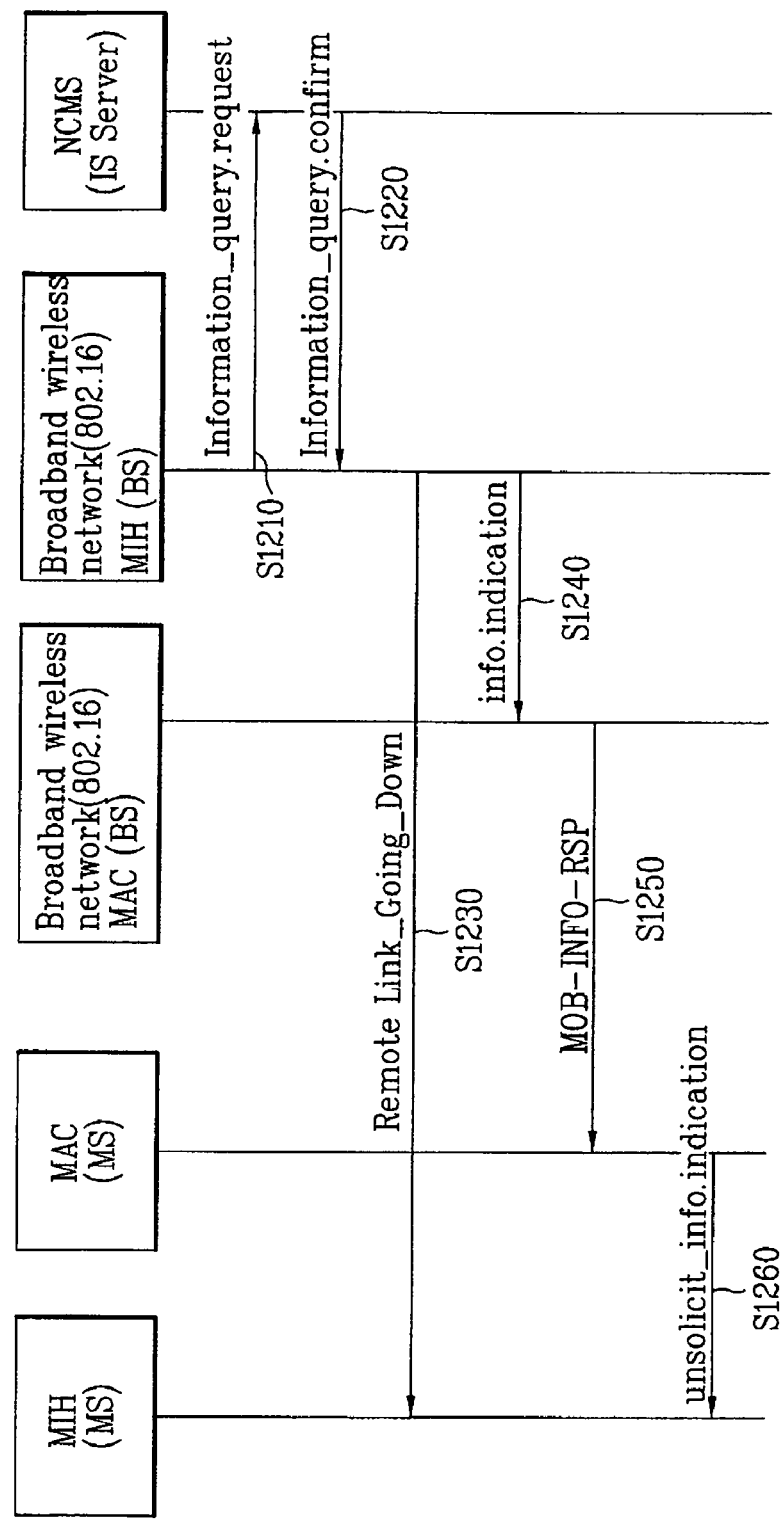
FIG. 12 is a flowchart of a procedure for acquiring an information service for another interface network from a current AP or POA of a broadband wireless access system via a unicast message, in accordance with one embodiment of the present invention.

FIG. 12 shows a multi-mode mobile subscriber station operating in a broadband wireless access system acquiring an information service for access points of another interface network from a broadband wireless access system base station via an unsolicited unicast message of the base station. Preferably, an information service server function is included in an NCMS.

Referring to FIG. 12, an MIH of a broadband wireless access system base station transfers an Information_query.request to an NCMS, either periodically or by some event, to acquire an information service associated with media independent handover (S1210). In one aspect of the invention, an IS server function may be included in the base station. In such a case, the information service request is executed within the base station. With regard to the IS server existing within the NCMS, the IS server transfers the information service to the MIH of the base station via an Information_query.confirm (S1220). However, as stated previously, the IS server function may be included in the base station. Accordingly, the transfer of the information service may be executed within the base station.

An MIH function of the base station then transfers a Remote Link_Going_Down trigger to the mobile subscriber station to hand over the mobile subscriber station to another network (S1230). Preferably, the handover occurs for enhancing a degraded signal quality of a currently accessed mobile subscriber station or for load balancing. The MIH of the base station transfers an info.indication primitive to its MAC to order the MAC (S1240) to transmit an information service message (MOB-INFO-RSP) to the mobile subscriber station. The MAC of the base station then transmits a unicast information service message to a MAC of the mobile subscriber station (S1250). Finally, after receiving the information service message from the base station, a MAC of the mobile subscriber station delivers information of the received MOB-INFO-RSP message to its MIH (S1260).

In the following embodiment of the present invention, a mobile subscriber station operating in a wireless LAN attempts handover to a broadband wireless network in order to be provided with an information service from the broadband wireless network. As mentioned in the foregoing description, the present invention relates to a system operating at least one of a broadband wireless network, a wireless LAN and a cellular system network. Therefore, a mobile subscriber station operating in the cellular system network or the like, as well as in the wireless LAN, can be provided with an information service. Preferably, the wireless LAN is an IEEE 802.11 system and the broadband wireless network is an IEEE 802.16 system.

Figure 13:
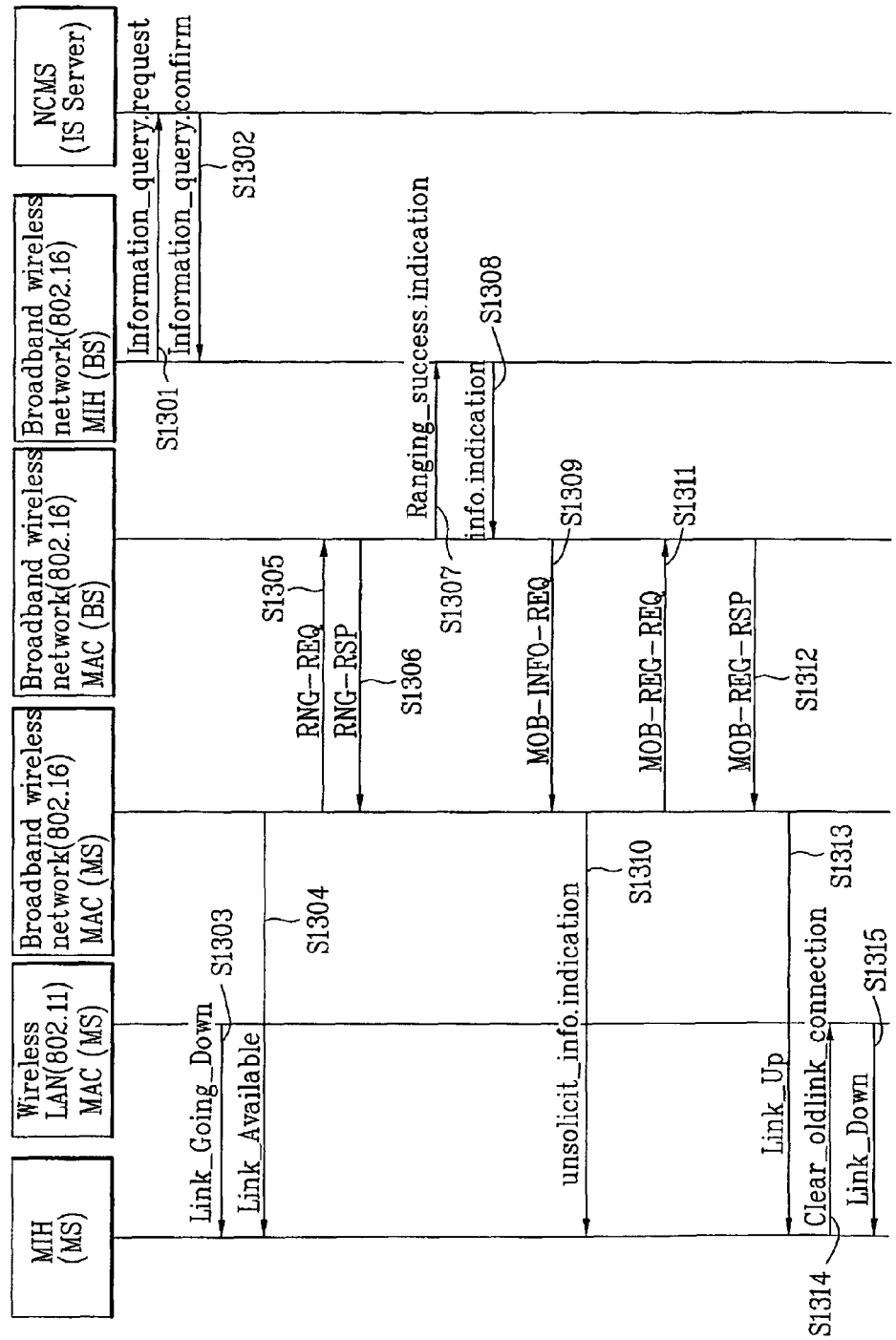
FIG. 13 is a flowchart of a procedure for acquiring an information service for a current network from a new AP or POA of a broadband wireless access system via a unicast message, in accordance with one embodiment of the present invention.

FIG. 13 shows a mobile subscriber station operating in a wireless LAN system creating a new connection by attempting handover to a base station of a broadband wireless access system. The mobile subscriber station is then provided with an information service associated with a network from a base station of the broadband wireless access system using an unsolicited unicast message from the base station.

Referring to FIG. 13, an MIH of a broadband wireless access system base station transfers an Information_query.request to an NCMS, either periodically or by some event, to acquire an information service associated with media independent handover (S1301). In one aspect of the invention, an IS server function may be included in the base station. In such a case, the information service request may be executed within the base station. With regard to the IS server existing within the NCMS, the IS server transfers the information service to the MIH of the base station via an Information_query.confirm (S1302). However, as stated previously, the IS server function may be included in the base station. Accordingly, the transfer of the information service may be executed within the base station.

Meanwhile, an MIH of a mobile subscriber station receives a Link_Going_Down trigger from its wireless LAN MAC and searches for a new link (S1303). A broadband wireless access system MAC of the mobile subscriber station then transfers a Link_Available trigger to the MIH of the mobile subscriber station (S1304). Afterward, the broadband wireless access system MAC of the mobile subscriber station transmits a range request (RNG-REQ) message to a broadband wireless access system MAC of the base station to create a connection to the base station of the broadband wireless access system (S1305).

The MAC of the base station then sends back a range response (RNG-RSP) message of success to the broadband wireless access system MAC of the mobile subscriber station (S1306). Thereafter, the MAC of the base station informs the MIH of the base station that the RNG-RSP message was transmitted to the mobile subscriber station using a Ranging_success.indication primitive (S1307). Having received the Ranging_success.indication primitive, the MIH of the base station transfers an info.indication primitive to its MAC layer to provide the information service to the mobile subscriber station (S1308). The MAC of the base station then transmits an MOB-INFO-RSP unicast message to the mobile subscriber station (S1309).

The broadband wireless access system MAC of the mobile subscriber station delivers information of the received MOB-INFO-RSP message to its MIH via an unsolicit_info_indication primitive (S1310). Preferably, the information included in the unsolicit_info_indication primitive is equal to the parameters of the MIH_info.confirm primitive explained in FIG. 8.

The broadband wireless access system MAC of the mobile subscriber station then transmits a registration request (MOB-REG-REQ) message to the base station of the broadband wireless access system (S1311). In response, the base station sends a registration response (MOB-REG-RSP) message to the broadband wireless access system MAC of the mobile subscriber station (S1312).

Thereafter, the broadband wireless access system MAC of the mobile subscriber station transmits a Link_Up trigger to the MIH of the mobile subscriber station (S1313). Upon receipt, the MIH of the mobile subscriber station orders the wireless LAN MAC to release a corresponding link via a Clear_oldlink_connection (S1314). After releasing the corresponding connection, the wireless LAN MAC transmits a Link_Down trigger to the MIH of the mobile subscriber station (S1315).

Accordingly, the present invention provides the following effects or advantages. First, the present invention may provide an information service for media independent handover to a multi-mode mobile subscriber station operating in a broadband wireless access system via MAC management messages between the mobile subscriber station and base station and primitives between the base station and NCMS. Accordingly, a current base station may provide information about a new access point to a mobile subscriber station attempting handover to another interface network.

Second, the present invention may provide useful information to a mobile subscriber station attempting handover to a broadband wireless access system base station from another interface network.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of providing a media independent information service (MIIS) for media independent handover (MIH) in a broadband wireless access system, the method comprising:
receiving, by a first lower entity of a mobile station, a MIH information request primitive requesting a set of information elements (IE) provided by the MIIS from a first upper entity of the mobile station;
transmitting, from the first lower entity of the mobile station, a MIH information request message comprising an information query list to retrieve the set of information elements to a second lower entity of a base station;
receiving, by the first lower entity of the mobile station, a MIH information response message comprising the set of information elements in response to the MIH information request message from the second lower entity of the base station; and
transmitting, from the first lower entity of the mobile station, a MIH information confirmation primitive including the set of information elements to the first upper entity of the mobile station,
wherein the set of information elements includes at least one of a channel IE representing channel information of a point of attachment (PoA), a quality of service (QoS) IE associated with a QoS level provided by the PoA, and a data rate IE associated with a data transport speed at the PoA, and
wherein the set of information elements are obtained by the second lower entity of the base station by transmitting an MIH information indication primitive to a second upper entity of the base station and receiving an MIH information response primitive from the second upper entity of base station.

2. The method of claim 1, wherein the set of information elements further includes at least one of an operator identifier IE for an access network, a network address IE associated with an internet protocol (IP) address of the PoA, and a location IE representing position information of the PoA.

3. The method of claim 2, wherein the information query list is configured with at least one bit associated with the set of information elements.

4. The method of claim 3, wherein the information query list is used for requesting at least one of the channel IE, the QoS IE, the data rate IE, the operator identifier IE, the network address IE, and a location IE.

5. The method of claim 1, wherein the MIH information request message and the MIH information response message are MIH protocol messages which are transmitted between the base station and the mobile station.

6. The method of claim 1, wherein the MIH information request primitive includes a destination identifier associated with the base station.

7. A method of providing a media independent information service (MIIS) for media independent handover (MIH) in a broadband wireless access system, the method comprising:
receiving, by a second lower entity of a base station, a MIH information request message comprising a information query list to retrieve a set of information elements (IE) provided by the MIIS from a first lower entity of a mobile station;
transmitting, from the second lower entity of the base station, a MIH information indication primitive to indicate reception of the MIH information request message to a second upper entity of the base station;
receiving, by the second lower entity of the base station, a MIH information response primitive including the set of information elements from the second upper entity of the base station; and
transmitting, from the second lower entity of the base station, a MIH information response message comprising the set of information elements in response to the MIH information request message to the first lower entity of the mobile station,
wherein the set of information elements includes at least one of a channel IE representing channel information of a point of attachment (PoA), a quality of service (QoS) IE associated with a QoS level provided by the PoA, and a data rate IE associated with a data transport speed at the PoA, and
wherein the set information elements are obtained by the second lower entity of the base station by transmitting an MIH information indication primitive to a second upper entity of the base station and receiving an MIH information response primitive from the second upper entity of the base station.

8. The method of claim 7, wherein the set of information elements further includes at least one of an operator identifier IE for an access network, a network address IE associated with an internet protocol (IP) address of the PoA, and a location IE representing position information of the PoA.

9. The method of claim 8, wherein the MIH information request message and the MIH information response message are MIH protocol messages which are transmitted between the base station and the mobile station.

10. The method of claim 8, wherein the information query list is configured with at least one bit associated with the set of information elements and is used for requesting at least one of the channel IE, the QoS IE, the data rate IE, the operator identified IE, the network address IE, and a location IE.

11. The method of claim 10, wherein the MIH information indication primitive includes the information query list.

12. A mobile station receiving a media independent information service (MIIS) in a broadband wireless access system, the mobile station comprising:
a first lower entity; and
a first upper entity,
wherein the first lower entity is configured to:
receive an MIH information request primitive from the first upper entity, the MIH information request primitive requesting a set of information elements (IE) provided by the MIIS;
transmit an MIH information request message to a second lower entity of a base station, the MIH information request message comprising an information query list to retrieve the set of IE;
receive an MIH information response message from the second lower entity of the base station entity in response to the MIH information request message, the MIH information response message comprising the set of IE; and
transmit an MIH information confirmation primitive including the set of IE to the first upper entity,
wherein the set of IE includes at least a channel IE representing channel information of a point of attachment (PoA), a quality of service (QoS) IE associated with a QoS level provided by the PoA or a data rate IE associated with a data transport speed at the PoA, and
wherein the set of information elements are obtained by the second lower entity of the base station by transmitting an MIH information indication primitive to a second upper entity of the base station and receiving an MIH information response primitive from the second upper entity of the base station.

13. The mobile station of claim 12, wherein the set of IE further includes at least an operator identifier IE for an access network, a network address IE associated with an internet protocol (IP) address of the PoA or a location IE representing position information of the PoA.

14. The mobile station of claim 13, wherein the MIH information request message and the MIH information response message are MIH protocol messages transmitted between the base station and the mobile station.

15. The mobile station of claim 13, wherein the MIH information request primitive includes a destination identifier associated with the second entity of the base station.

16. The mobile station of claim 13, wherein the information query list is configured with at least one bit associated with the set of IE and is used for requesting at least the channel IE, the QoS IE, the data rate IE, an operator identifier IE, a network address IE or a location IE.

17. A base station for providing a media independent information service (MIIS) for media independent handover (MIH) in a broadband wireless access system, the base station comprising:
a second lower entity; and
a second upper entity,
wherein the second lower entity is configured to:
receive an MIH information request message from a first lower entity of a mobile station, the MIH information request message comprising an information query list to retrieve a set of information elements (IE) provided by the MIIS;
transmit an MIH information indication primitive to the second upper entity to indicate reception of the MIH information request message;
receive an MIH information response primitive including the set of information elements from the second upper entity; and
transmit an MIH information response message comprising the set of IE to the first lower entity of the mobile station in response to the MIH information request message,
wherein the set of IE includes at least a channel IE representing channel information of a point of attachment (PoA), a quality of service (QoS) IE associated with a QoS level provided by the PoA or a data rate IE associated with a data transport speed at the PoA, and
wherein the set of information elements are obtained by the second lower entity of the base station by transmitting an MIH information indication primitive to a second upper entity of the base station and receiving an MIH information response primitive from the second upper entity of the base station.

18. The base station of claim 17, wherein the set of IE further includes at least an operator identifier IE for an access network, a network address IE associated with an internet protocol (IP) address of the PoA or a location IE representing position information of the PoA.

19. The base station of claim 18, wherein the MIH information request message and the MIH information response message are MIH protocol messages transmitted between the base station and the mobile station.

20. The base station of claim 18, wherein the information query list is configured with at least one bit associated with the set of information elements and is used for requesting at least the channel IE, the QoS IE, the data rate IE, an operator identifier IE, a network address IE or a location IE.

21. The base station of claim 20, wherein the MIH information indication primitive includes the information query list.

* * * * *